United States Patent
Grubman

Patent Number: 5,875,058
Date of Patent: Feb. 23, 1999

[54] GRADED INDEX CYLINDRICAL MICROLENS FOR LASER DIODE BEAM CORRECTION

[75] Inventor: Ronald E. Grubman, Larkin Valley, Calif.

[73] Assignee: Blue Sky Research, San Jose, Calif.

[21] Appl. No.: 833,979

[22] Filed: Apr. 11, 1997

[51] Int. Cl.⁶ .................................................. G02B 3/00
[52] U.S. Cl. ......................... 359/654; 359/652; 359/710
[58] Field of Search .................................. 359/652, 653, 359/710, 654, 683

[56] References Cited

U.S. PATENT DOCUMENTS 5,607,492  3/1997  Doric ........................................ 359/652
5,638,214  6/1997  Doric ........................................ 359/652

*Primary Examiner*—Georgia Epps
*Assistant Examiner*—Evelyn A. Lester
*Attorney, Agent, or Firm*—LaRiviere, Grubman & Payne, LLP

[57] ABSTRACT

A graded-index microcylindrical lens functioning in combination with a laser diode beam to change the divergence of the fast axis on an incoming laser beam from one divergence to another, but not to collimate the beam. In one embodiment of the present invention, the graded-index microcylindrical lens changes the divergence of one axis of the laser beam to be substantially equal to the divergence of the slow axis.

2 Claims, 1 Drawing Sheet

GRADED INDEX CYLINDRICAL MICROLENS FOR LASER DIODE BEAM CORRECTION

TECHNICAL FIELD

The present invention relates generally to graded-index cylindrical microlenses, and more particularly to the use of such lenses with laser diodes.

BACKGROUND OF THE INVENTION

The output beam of a laser diode typically diverges a t a small angel (5°–15°) in one axis, the "slow" axis, and at a much larger angle (25°–80°) in the other, or "fast" axis, and it is desirable to correct the beam so as to provide an angularly symmetric beam.

In U.S. Pat. No. 5,171,224, titled "Microoptic Lenses", filed May 10, 1991, there are taught a number of configurations including cylindrical microlenses, although not of the graded-index type. Some of these configurations include lenses which change the divergence of an entering beam in the fast axis to a different divergence; in some cases the output beam is collimated; and in cases the angle of the fast axis is reduced to match the angle of the slow axis, i.e., the beam is circularized.

In recent years a new type of cylindrical microlens has come into use, a graded index lens, in which the index of refraction is graded in a radially symmetric manner. This resultant graded-index lens will affect the propagation of one axis of a light beam incident on the microlens in a direction perpendicular to the longitudinal axis of the lens. Such a lens is described in various publications by Sead Doric, including product literature and Canadian Patent Application No.: 2,135,128 (laid open for inspection), entitled: "NONFULL APERTURE LUNEBERG-TYPE LENS WITH A GRADED INDEX CORE AND HOMOGENOUS CLADDING, METHOD FOR FORMING THEREOF, AND HIGH NUMERICAL APERTURE LASER DIODE ASSEMBLY" (hereafter the '128 reference.).

In each of the Doric references of which the present inventor is aware (including the '128 reference), the graded-index cylindrical microlenses are always used to collimate the fast axis of the incident laser beams.

The present inventor is also aware of a "posting" on the Internet, in which a graded-index lens is used to reimage, rather than collimate, the beam on the slow axis, but not in the fast axis.

DISCLOSURE OF INVENTION

The present invention provides a graded-index microcylindrical lens functioning in combination with a laser diode beam to change the fast axis divergence on an incoming laser beam from one divergence to another, but not to collimate the beam. In a preferred embodiment, the graded-index microcylindrical lens changes the divergence of the fast axis of the laser beam to be substantially equal to the divergence of the slow axis.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing in the following detailed description of the Best Mode of Carrying Out the Invention. In the drawing.

Figure 1A:
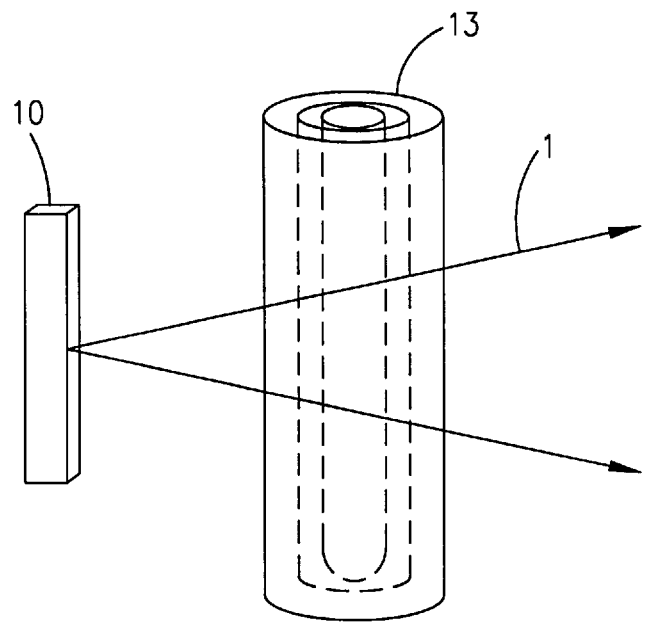
FIG. 1a is representation of a laser diode having in operative combination therewith a graded index microcylindrical lens, showing the output beam in the slow axis.

Reference numbers refer to the same or equivalent parts of the invention throughout the several figures of the drawing.

BEST MODE OF CARRYING OUT THE INVENTION

In the above-described references by Sead Doric, it is taught to use a graded-index cylindrical microlens to collimate the fast axis of a laser beam emanating from a laser diode. Such collimation can be useful for the reasons disclosed by Doric in those references, including various configurations of a laser diode with microlenses and other lenses.

Figure 1B:
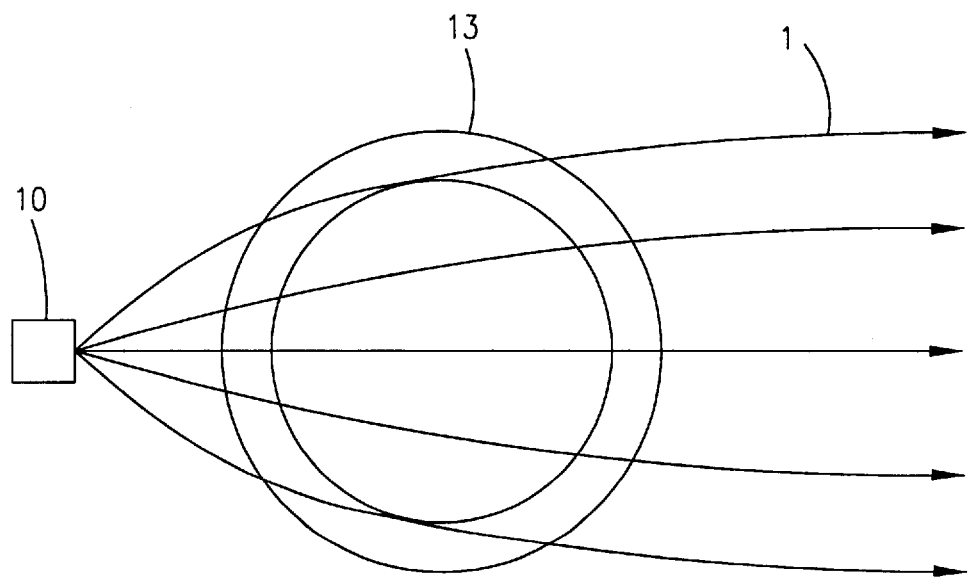
FIG. 1b is representation of a laser diode having in operative combination therewith a graded index microcylindrical lens, showing the output beam in the fast axis.

However, there may be circumstances in which it is not desirable to collimate the fast axis, but rather to alter the divergence of the beam from the incident divergence to a different exit divergence. This can be accomplished, for example, by positioning the laser diode inside or outside of the focus of the microcylindrical lens. Having reference to FIG. 1a, a laser diode beam 1, emitted from a laser diode 10 diverges at an angle of about 12 degrees in the "slow axis", while in FIG. 1b beam 1 diverges at about 40 degrees in the "fast axis". In FIGS. 1a and 1b, laser diode 10 is positioned inside of the focus of a graded index microcylindrical lens 13. The fast axis of the laser diode beam is thereby reduced in divergence from about 40 degrees to a lower divergence, which may, e.g. be selected to be about 12 degrees, to match the divergence of the slow axis. Alternatively, other angles may also be selected.

In none of the above-referenced Doric references is there any suggestion to alter the divergence of the fast axis of the laser diode beam other than by collimating the fast axis. Indeed, in some of the product literature, Doric confronts the problem of focusing a laser diode beam into a single mode fiber using a crossed-lens configuration, and he accomplishes this goal by first collimating the beam in each axis with a pair of crossed microcylindrical lenses, and then refocusing the collimated beams into the fiber with another pair of the microcylindrical lenses. Apparently, none of these references recognize that much of the complexity of that configuration can be avoided by following the teaching of the present invention, which in this case would provide that one lens of a single pair of the graded-index microcylindrical lenses should be used to directly focus the beam from the diverging fast axis into the fibre and the other lens should do the same for the diverging beam in the slow axis. In this manner one pair of lenses can be eliminated completely.

In the practice of the present invention, it is possible that the resulting beam will display astigmatism in varying amounts, but in accordance with the teachings of the present invention this astigmatism may be acceptable in certain circumstances, such as in the system described in a U.S. Patent Application titled "MULTIPLE ELEMENT LASER DIODE ASSEMBLY INCORPORATING A CYLINDRICAL MICROLENS", filed on Apr. 11, 1997, Ser. No. 08/837,002 and identified by Attorney's Docket No. P718.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. An optical assembly comprising:

an optical source emitting beam having a fast diverging axis and a slow diverging axis orthogonal to said fast axis; and a graded-index cylindrical microlens for changing the divergence of said beam along said fast axis from a first divergence to a non-zero output divergence of said graded-index cylindrical microlens by adjusting the distance of said microlens from said source.

2. The optical assembly of claim 1 wherein said non-zero output divergence is equal to the divergence of said slow axis.

* * * * *